(12) United States Patent
Kurokawa et al.

(10) Patent No.: US 10,114,317 B2
(45) Date of Patent: Oct. 30, 2018

(54) IMAGE FORMING APPARATUS

(71) Applicant: KYOCERA Document Solutions Inc., Osaka-shi (JP)

(72) Inventors: Ayaka Kurokawa, Osaka (JP); Teppei Shibuya, Osaka (JP); Satoru Nakamura, Osaka (JP)

(73) Assignee: KYOCERA DOCUMENT SOLUTIONS INC., Osaka-Shi, Osaka (JP)

(*) Notice: Subject to any disclaimer, the term of this patent is extended or adjusted under 35 U.S.C. 154(b) by 0 days.

(21) Appl. No.: 15/878,458

(22) Filed: Jan. 24, 2018

(65) Prior Publication Data

US 2018/0217530 A1 Aug. 2, 2018

(30) Foreign Application Priority Data

Jan. 30, 2017 (JP) ................................ 2017-013958

(51) Int. Cl.
*H04N 1/29* (2006.01)
*G03G 15/16* (2006.01)

(52) U.S. Cl.
CPC ..... *G03G 15/1665* (2013.01); *G03G 15/1605* (2013.01); *H04N 1/29* (2013.01); *H04N 2201/0094* (2013.01)

(58) Field of Classification Search
CPC ............. G03G 15/1605; G03G 15/161; G03G 15/1615; G03G 15/1665
See application file for complete search history.

(56) References Cited

U.S. PATENT DOCUMENTS

| 2008/0112734 A1* | 5/2008 | Furuya | ................. | G03G 15/161 |
| | | | | 399/288 |
| 2009/0080919 A1* | 3/2009 | Okada | ................ | G03G 15/6564 |
| | | | | 399/45 |
| 2015/0198914 A1* | 7/2015 | Watanabe | .......... | G03G 15/1685 |
| | | | | 399/302 |

FOREIGN PATENT DOCUMENTS

JP  2014-153398  8/2014

* cited by examiner

*Primary Examiner* — Carla J Therrien
(74) *Attorney, Agent, or Firm* — Gerald E. Hespos; Michael J. Porco; Matthew T. Hespos (57) ABSTRACT

In order to prevent interference between a primary transfer bias voltage and a secondary transfer bias voltage, and to prevent occurrence of an image defect due to interference between these bias voltages, an image forming apparatus includes a plurality of primary transfer rollers, an intermediate transfer belt, a drive roller, a secondary transfer roller, and a rectifier roller. A primary transfer bias voltage of a polarity opposite to the polarity of toner is applied to a primary transfer bias applying unit. A secondary transfer bias voltage of a same polarity as the polarity of toner is applied to the drive roller. The rectifier roller is disposed between a most-downstream primary transfer roller and the drive roller. A bias voltage of the same polarity as the polarity of the primary transfer bias voltage or the polarity of the secondary transfer bias voltage is applied to the rectifier roller.

7 Claims, 5 Drawing Sheets

IMAGE FORMING APPARATUS

This application is based on Japanese Patent Application No. 2017-013958 filed on Jan. 30, 2017, the contents of which are hereby incorporated by reference.

BACKGROUND

The present disclosure relates to an image forming apparatus for forming a toner image on a sheet.

Conventionally, there is known an image forming apparatus including an intermediate transfer belt disposed to face a plurality of photosensitive drums. A plurality of primary transfer rollers are disposed on an inner peripheral surface of the intermediate transfer belt to face the plurality of photosensitive drums. Further, the intermediate transfer belt is supported by a drive roller and a driven roller, and is circulatingly moved along a predetermined circulating direction. The drive roller is disposed to face a secondary transfer roller, and forms a secondary transfer nip portion in cooperation with the secondary transfer roller.

In the technique as described above, a conductive member configured to come into contact with the inner peripheral surface of the intermediate transfer belt is disposed between the drive roller, and a primary transfer roller disposed on the most-downstream side among the plurality of primary transfer rollers in the circulating direction of the intermediate transfer belt. The conductive member is grounded, and leak current of a primary transfer bias voltage to be applied to the primary transfer roller, or leak current of a secondary transfer bias voltage to be applied to the drive roller flows in the conductive member.

SUMMARY

An image forming apparatus according to an aspect of the present disclosure includes a plurality of photosensitive drums, an intermediate transfer belt, a plurality of primary transfer rollers, a support roller, a secondary transfer roller, a conductive contact member, a primary transfer bias applying unit, a secondary transfer bias applying unit, and a contact-member bias applying unit. Each of the plurality of photosensitive drums is configured to form an electrostatic latent image on a surface thereof, and to carry a toner image. The intermediate transfer belt is disposed to face the plurality of photosensitive drums, and is configured to circulatingly move along a predetermined circulating direction. Each of the plurality of primary transfer rollers is disposed to face a corresponding one of the plurality of photosensitive drums with respect to the intermediate transfer belt, and is configured to primarily transfer the toner image from the corresponding one of the plurality of photosensitive drums onto the intermediate transfer belt. The support roller supports an inner peripheral surface of the intermediate transfer belt on a downstream side than the plurality of primary transfer rollers in the circulating direction. The secondary transfer roller is disposed to face the support roller with respect to the intermediate transfer belt, and is configured to secondarily transfer the toner image from the intermediate transfer belt onto a sheet. The contact member is disposed to come into contact with the inner peripheral surface of the intermediate transfer belt between the support roller, and a most-downstream primary transfer roller located on a most-downstream side among the plurality of primary transfer rollers in the circulating direction. The primary transfer bias applying unit applies a primary transfer bias voltage of a polarity opposite to a polarity of the toner to the plurality of primary transfer rollers. The secondary transfer bias applying unit applies a secondary transfer bias voltage of a same polarity as the polarity of the toner to the support roller. The contact-member bias applying unit applies a bias voltage of a same polarity as the polarity of the primary transfer bias voltage or the polarity of the secondary transfer bias voltage to the contact member.

These and other objects, features and advantages of the present disclosure will become more apparent upon reading the following detailed description along with the accompanying drawings.

DETAILED DESCRIPTION

Figure 1:
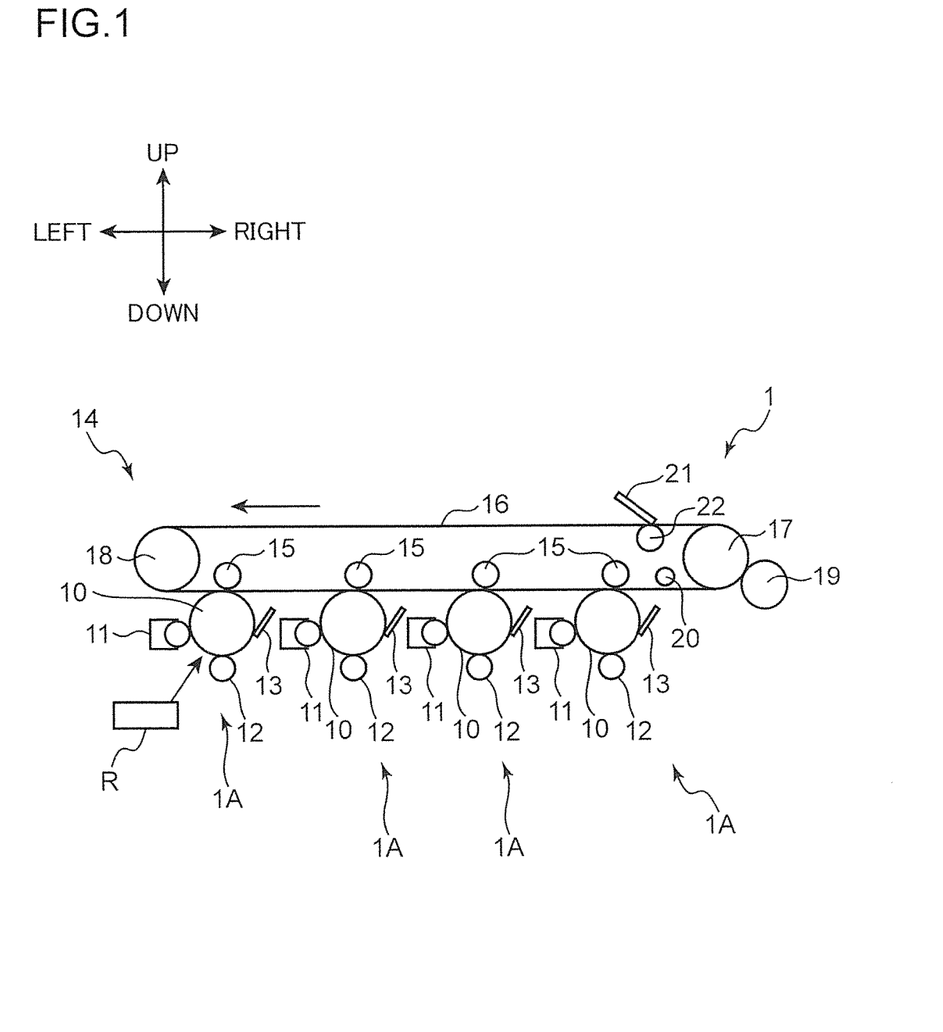
FIG. 1 is a schematic sectional view illustrating an inner structure of an image forming apparatus according to a first embodiment of the present disclosure.

In the following, a first embodiment of the present disclosure is described in detail with reference to the drawings. FIG. 1 is a schematic sectional view illustrating an inner structure of an image forming apparatus 1 according to the present embodiment. In this example, the image forming apparatus 1 is a so-called color printer. The image forming apparatus according to the present disclosure, however, may be a color copying machine, a facsimile machine, or a complex machine having functions of these machines.

The image forming apparatus 1 includes an unillustrated housing. Members as illustrated in FIG. 1 are disposed within the housing. The image forming apparatus 1 includes four image forming units 1A. The image forming units 1A are disposed in association with four colors i.e. yellow, cyan, magenta, and black, respectively. In this example, a configuration of one of the four image forming units 1A is described. Configurations of the other image forming units 1A are the same as the configuration of the one of the four image forming units 1A.

The image forming unit 1A includes a photosensitive drum 10, a developing device 11, a charging roller 12, and a cleaning blade 13. The photosensitive drum 10 has a circumferential surface (outer surface) on which an electrostatic latent image is formed. Further, a toner image is formed on the circumferential surface of the photosensitive drum 10. The developing device 11 supplies toner to the circumferential surface of the photosensitive drum 10. In the present embodiment, toner has a property such that the toner is positively charged. The charging roller 12 uniformly charges the circumferential surface of the photosensitive drum 10 to a predetermined potential. An exposure device R for irradiating exposure light onto the photosensitive drum 10 in accordance with an image is disposed between the charging roller 12 and the developing device 11. The cleaning blade 13 cleans the circumferential surface of the photosensitive drum 10 after a toner image is transferred from the photosensitive drum 10 onto a transfer unit 14 to be described later.

Further, the image forming apparatus 1 includes the transfer unit 14. The transfer unit 14 transfers a toner image from the circumferential surface of the photosensitive drum 10 onto a sheet. The transfer unit 14 includes a plurality of (four) primary transfer rollers 15 disposed in association with the image forming units 1A of the respective colors, an intermediate transfer belt 16, a drive roller 17 (support roller), a driven roller 18, and a secondary transfer roller 19.

The plurality of primary transfer rollers 15 are disposed to face the photosensitive drums 10 respectively with respect to the intermediate transfer belt 16. A primary transfer bias voltage of a polarity (minus) opposite to the polarity of toner is applied to the primary transfer roller 15 from a primary transfer bias applying unit 50 (power supply) to be described later. Thus, the primary transfer roller 15 primarily transfers a toner image from the photosensitive drum 10 onto the intermediate transfer belt 16.

The intermediate transfer belt 16 is disposed to face the plurality of photosensitive drums 10. As illustrated by the arrow in FIG. 1, the intermediate transfer belt 16 is circulatingly moved along a predetermined circulating direction. The intermediate transfer belt 16 carries toner images of the respective colors on a surface thereof in a superimposing manner. The drive roller 17 supports an inner peripheral surface of the intermediate transfer belt 16 on a downstream side than the plurality of primary transfer rollers 15 in the circulating direction of the intermediate transfer belt 16. Further, the drive roller 17 includes an outer peripheral surface which comes into contact with the inner peripheral surface of the intermediate transfer belt 16, and transmits a driving force for circulatingly driving the intermediate drive belt 16 to the intermediate transfer belt 16. A secondary transfer bias voltage of the same polarity as the polarity of toner is applied to the drive roller 17 from a secondary transfer bias applying unit 60 (power supply) to be described later. The driven roller 18 comes into contact with the inner peripheral surface of the intermediate transfer belt 16 on the side opposite to the drive roller 17. The driven roller 18 is rotated in accordance with movement of the intermediate transfer belt 16.

The secondary transfer roller 19 transfers (secondarily transfers) a toner image from the intermediate transfer belt 16 onto a sheet in cooperation with the drive roller 17. The secondary transfer roller 19 is disposed to face the drive roller 17 with respect to the intermediate transfer belt 16. The secondary transfer roller 19 is grounded.

Further, the image forming apparatus 1 includes an unillustrated sheet feeding unit and an unillustrated fixing device. The sheet feeding unit feeds a sheet to a secondary transfer nip portion to be formed by the drive roller 17 and the secondary transfer roller 19. The fixing device is disposed on a downstream side than the secondary transfer nip portion in a sheet conveying direction, and applies processing of fixing a transferred toner image on the sheet.

Figure 2:
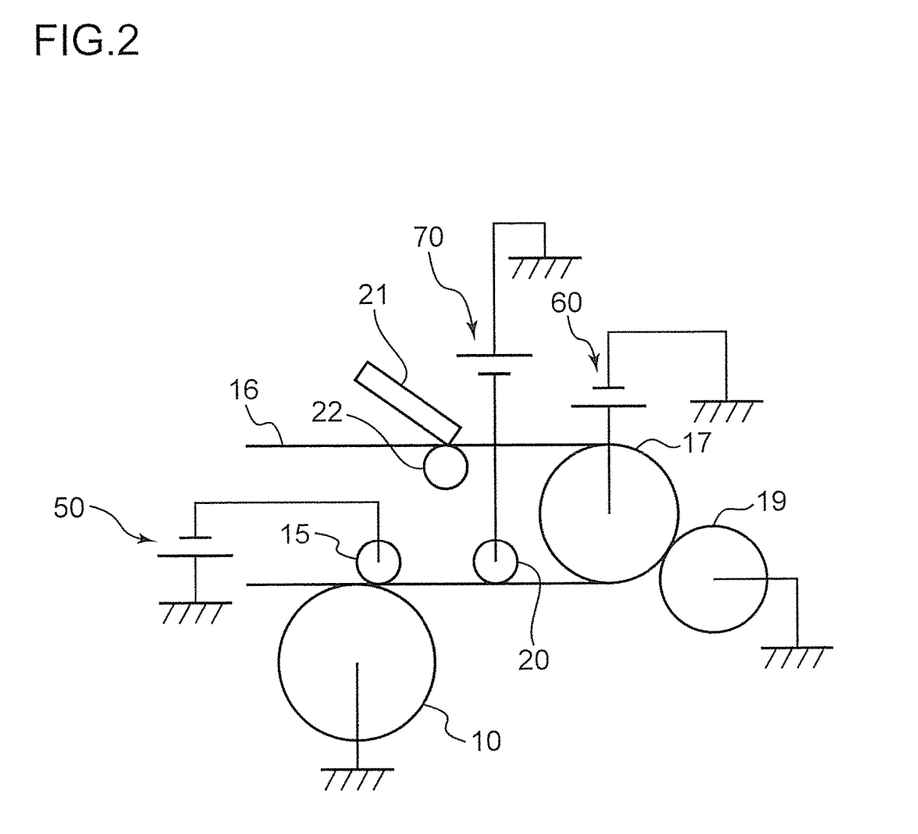
FIG. 2 is a schematic sectional view illustrating a structure on the periphery of a most-downstream primary transfer roller and a support roller in the image forming apparatus according to the first embodiment of the present disclosure.

FIG. 2 is a schematic sectional view illustrating a structure on the periphery of a most-downstream primary transfer roller 15 and the drive roller 17 in the image forming apparatus 1 according to the present embodiment.

The image forming apparatus 1 further includes a rectifier roller 20 (contact member), a blade 21, a blade opposing roller 22, the primary transfer bias applying unit 50, the second transfer bias applying unit 60, and a first rectifier bias applying unit 70 (contact-member bias applying unit).

The rectifier roller 20 is disposed to come into contact with the inner peripheral surface of the intermediate transfer belt 16 between the drive roller 17, and the most-downstream primary transfer roller 15 located on a most downstream side among the plurality of primary transfer rollers 15 in the circulating direction of the intermediate transfer belt 16. The rectifier roller 20 is constituted by a conductive metal roller having an outer peripheral surface that comes into contact with the inner peripheral surface of the intermediate transfer belt 16. The rectifier roller 20 is rotatably supported on an unillustrated bearing. Further, the rectifier roller 20 is rotated in accordance with circulating movement of the intermediate transfer belt 16 when a driving force is applied from the intermediate transfer belt 16 by contact of the inner peripheral surface of the intermediate transfer belt 16 with the outer peripheral surface of the rectifier roller 20. The length of the rectifier roller 20 in an axis direction thereof is set to be equal to a length at least including an image forming area on the intermediate transfer belt 16 where a toner image is formed. Further, the rectifier roller 20 is not limited to a member made of a completely conductive material, and may be a member having a semiconductive property.

The blade 21 comes into contact with the outer peripheral surface of the intermediate transfer belt 16 on a downstream side than the drive roller 17 in the circulating direction of the intermediate transfer belt 16. The blade 21 extends along a width direction of the intermediate transfer belt 16 (direction orthogonal to the plane of FIG. 2). The blade 21 has a function of scraping off toner residue from the intermediate transfer belt 16 after a toner image is transferred onto a sheet. In another embodiment, the blade 21 may have a function of facilitating toner recovery by an unillustrated cleaning unit disposed on a further downstream side than the blade 21 by causing toner residue to float on the intermediate transfer belt 16. In view of the above, an unillustrated brush member may be disposed at a position of the blade 21, in place of the blade 21.

The blade opposing roller 22 is a conductive metal roller disposed to come into contact with the inner peripheral surface of the intermediate transfer belt 16 on a downstream side than the drive roller 17 in the circulating direction of the intermediate transfer belt 16. The blade opposing roller 22 is disposed to face the blade 21 with respect to the intermediate transfer belt 16. Thus, a contact pressure of the blade 21 (amount of holding the blade 21) with respect to the intermediate transfer belt 16 is stably maintained. The blade opposing roller 22 may be a roller that is fixedly supported, or may be a roller that is rotated in accordance with movement of the intermediate transfer belt 16. As illustrated in FIG. 2, the blade opposing roller 22 is disposed above an area between the primary transfer roller 15 and the rectifier roller 20 in a horizontal direction.

The primary transfer bias applying unit 50 includes a direct-current power supply and an alternate-current power supply. The primary transfer bias applying unit 50 applies a primary transfer bias voltage of a polarity opposite to the polarity of toner to the plurality of primary transfer rollers 15. Then, primary transfer current flows from the primary transfer roller 15 to the photosensitive drum 10, and a transfer electric field for primarily transferring toner is formed from the side of the photosensitive drum 10 to the side of the primary transfer roller 15.

The secondary transfer bias applying unit 60 includes a direct-current power supply and an alternate-current power supply. The secondary transfer bias applying unit 60 applies a secondary transfer bias voltage of the same polarity as the polarity of toner to the drive roller 17. Then, secondary transfer current flows from the secondary transfer roller 19 to the drive roller 17, and a transfer electric field for secondarily transferring toner is formed from the side of the drive roller 17 to the side of the secondary transfer roller 19. In this manner, in this embodiment, the secondary transfer bias is applied to the intermediate transfer belt 16 by way of the inner peripheral surface of the intermediate transfer belt 16.

The first rectifier bias applying unit 70 includes a direct-current power supply and an alternate-current power supply. The first rectifier bias applying unit 70 applies a bias voltage of the same polarity as the polarity of a primary transfer bias voltage or the polarity of a secondary transfer bias voltage to the rectifier roller 20. In the present embodiment, the first rectifier bias applying unit 70 applies a bias voltage of the same polarity as the polarity of a primary transfer bias voltage to the rectifier roller 20.

When an image forming operation is performed in the image forming apparatus 1, a toner image formed on the photosensitive drum 10 is primarily transferred onto the intermediate transfer belt 16 by the primary transfer roller 15. Further, the toner image formed on the intermediate transfer belt 16 is secondarily transferred onto a sheet by the drive roller 17 and the secondary transfer roller 19. In this case, a bias voltage to be applied to the most-downstream primary transfer roller 15 and a bias voltage to be applied to the drive roller 17 in FIG. 2 are bias voltages of polarities opposite to each other. Specifically, an area between the primary transfer roller 15 and the drive roller 17 is brought to a state in which current is likely to flow by way of the inner peripheral surface of the intermediate transfer belt 16. When it is assumed that current flows between the primary transfer roller 15 and the drive roller 17 during a primary transfer operation and a secondary transfer operation, noise current may be generated in each of the transfer operations, and an image defect may occur in a transferred image. In the present embodiment, in order to solve the aforementioned inconvenience, the rectifier roller 20 and the first rectifier bias applying unit 70 illustrated in FIG. 2 are provided.

Specifically, in the present embodiment, the first rectifier bias applying unit 70 applies a bias voltage of the same polarity as the polarity of a primary transfer bias voltage to the rectifier roller 20 during an image forming operation. In this case, since the potential of the primary transfer roller 15 and the potential of the rectifier roller 20 have the same polarities, leak current of primary transfer current is less likely to flow from the most-downstream primary transfer roller 15 to the rectifier roller 20. Further, in this case, the potential of the drive roller 17 and the potential of the rectifier roller 20 have polarities opposite to each other. Therefore, although leak current of secondary transfer current is likely to flow from the drive roller 17 to the rectifier roller 20, the leak current is less likely to flow to the most-downstream primary transfer roller 15. Thus, interference between a primary transfer bias voltage and a secondary transfer bias voltage is prevented, and occurrence of an image defect due to interference between these bias voltages is prevented.

Further, in the present embodiment, interference between a primary transfer bias voltage and a secondary transfer bias voltage is prevented by contact of the single rectifier roller 20 with the inner peripheral surface of the intermediate transfer belt 16. Therefore, as compared with a case where a plurality of members are disposed adjacent to each other along a circulating direction of an intermediate transfer belt 16, a configuration on the periphery of the intermediate transfer belt 16 is made compact. This makes it possible to downsize the image forming apparatus 1.

As described above, in the present embodiment, the first rectifier bias applying unit 70 applies a bias voltage to the rectifier roller 20 in such a manner that leak current is allowed to flow from the drive roller 17 to the rectifier roller 20, and flow of leak current from the most-downstream primary transfer roller 15 to the rectifier roller 20 is prevented. Therefore, it is possible to securely prevent interference between a primary transfer bias voltage and a secondary transfer bias voltage, and to securely prevent occurrence of an image defect due to interference between these bias voltages.

In FIG. 2, the first rectifier bias applying unit 70 may apply, to the rectifier roller 20, a bias voltage of the same polarity as the polarity of a secondary transfer bias voltage. In this case, leak current of secondary transfer current is less likely to flow from the drive roller 17 to the rectifier roller 20. Further, in this case, even when leak current of primary transfer current flows from the most-downstream primary transfer roller 15 to the rectifier roller 20, the leak current is less likely to flow to the drive roller 17. Therefore, it is possible to prevent interference between a primary transfer bias voltage and a secondary transfer bias voltage, and to prevent occurrence of an image defect due to interference between these bias voltages.

Further, in the present embodiment, the rectifier roller 20 is a roller member having an outer peripheral surface which comes into contact with an inner peripheral surface of the intermediate transfer belt 16. Therefore, as compared with a case where a contact member according to the present disclosure is constituted by a flat plate member which comes into contact with an inner peripheral surface of an intermediate transfer belt 16, it is possible to reduce sliding resistance between the rectifier roller 20 and the intermediate transfer belt 16. Further, since the rectifier roller 20 is rotatable in accordance with movement of the intermediate transfer belt 16, it is possible to further reduce sliding resistance between the rectifier roller 20 and the intermediate transfer belt 16.

Figure 3:
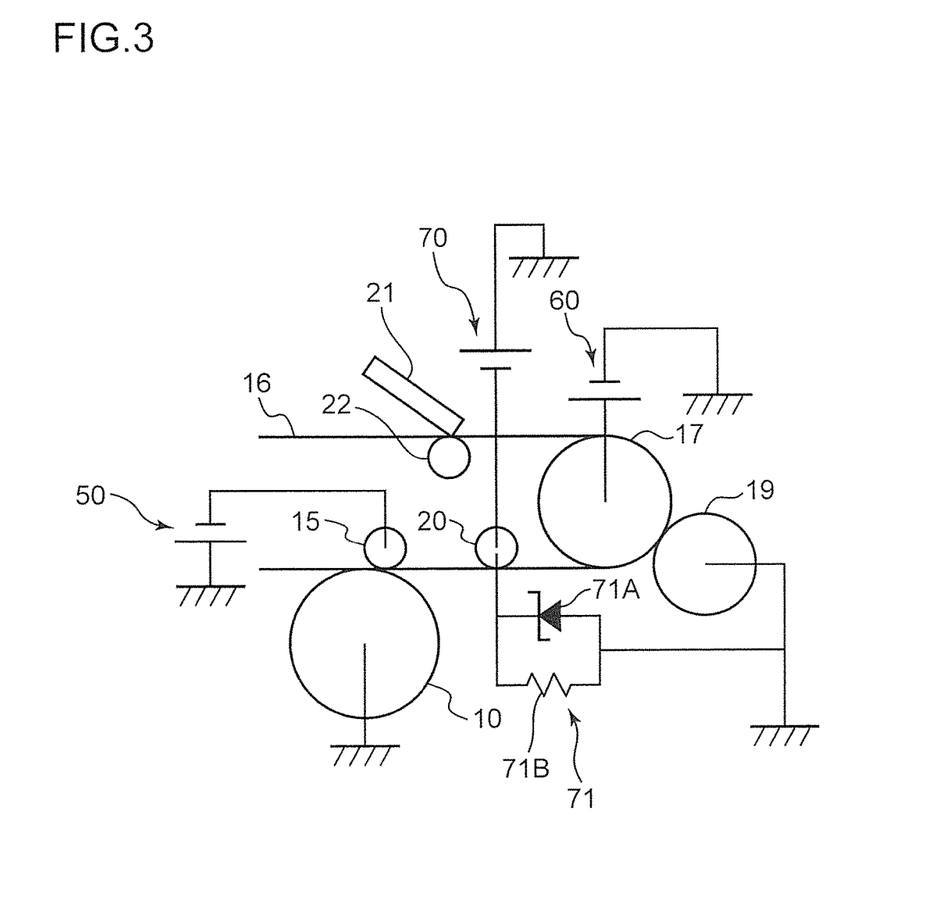
FIG. 3 is a schematic sectional view illustrating a structure on the periphery of a most-downstream primary transfer roller and a support roller in an image forming apparatus according to a second embodiment of the present disclosure.

Next, an image forming apparatus according to a second embodiment of the present disclosure is described. FIG. 3 is a schematic sectional view illustrating a structure on the periphery of a most-downstream primary transfer roller 15 and a drive roller 17 in the image forming apparatus according to the present embodiment. In FIG. 3, members having the same functions as those of the members in the first embodiment are indicated with the same reference numerals as those in FIG. 2. Further, since the second embodiment is different from the first embodiment in a point that the image forming apparatus in the second embodiment includes a resistance unit 71, description on the different point is described, and description on the same points is omitted.

Referring to FIG. 3, the image forming apparatus include the resistance unit 71. One end of the resistance unit 71 is electrically connected to a rectifier roller 20. Further, the other end of the resistance unit 71 is grounded. The resistance unit 71 includes a resistor 71B and a Zener diode 71A (rectifying element) connected to each other in parallel. According to the aforementioned configuration, the potential of the rectifier roller 20 is stably maintained at a target potential by the resistance unit 71. In particular, since the rectifier roller 20 is grounded via the Zener diode 71A, the potential of the rectifier roller 20 is stably maintained. Further, since the resistance unit 71 includes the resistor 71B, the potential of the rectifier roller 20 is stably maintained. Therefore, the aforementioned configuration is further advantageous in preventing that leak current flows in and out between the primary transfer roller 15 and the drive roller 17 by a bias voltage (rectifier bias voltage) to be applied to the rectifier roller 20 by a first rectifying bias applying unit 70.

Further, in the present embodiment, even when leak current flowing from the drive roller 17 to the rectifier roller 20 is likely to change by a belt resistance value of an intermediate transfer belt 16 or a resistance value of a secondary transfer nip portion, it is possible to stably maintain the potential of the rectifier roller 20. The resistance value of the secondary transfer nip portion also varies depending on the presence or absence of a sheet passing through the secondary transfer nip portion.

Figure 4:
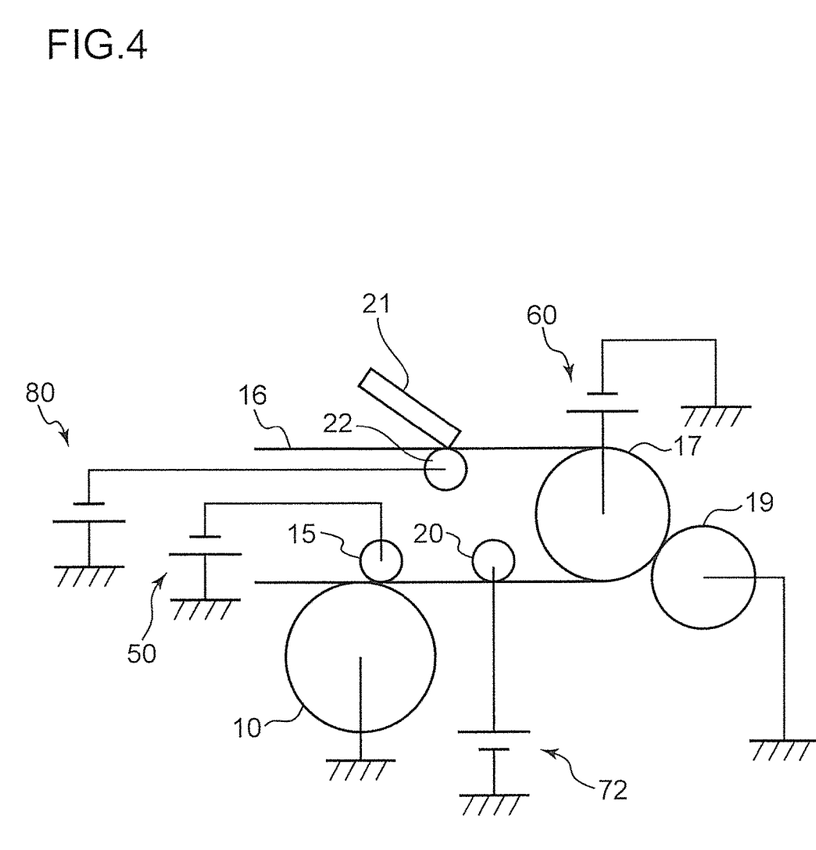
FIG. 4 is a schematic sectional view illustrating a structure on the periphery of a most-downstream primary transfer roller and a support roller in an image forming apparatus according to a third embodiment of the present disclosure.
Figure 5:
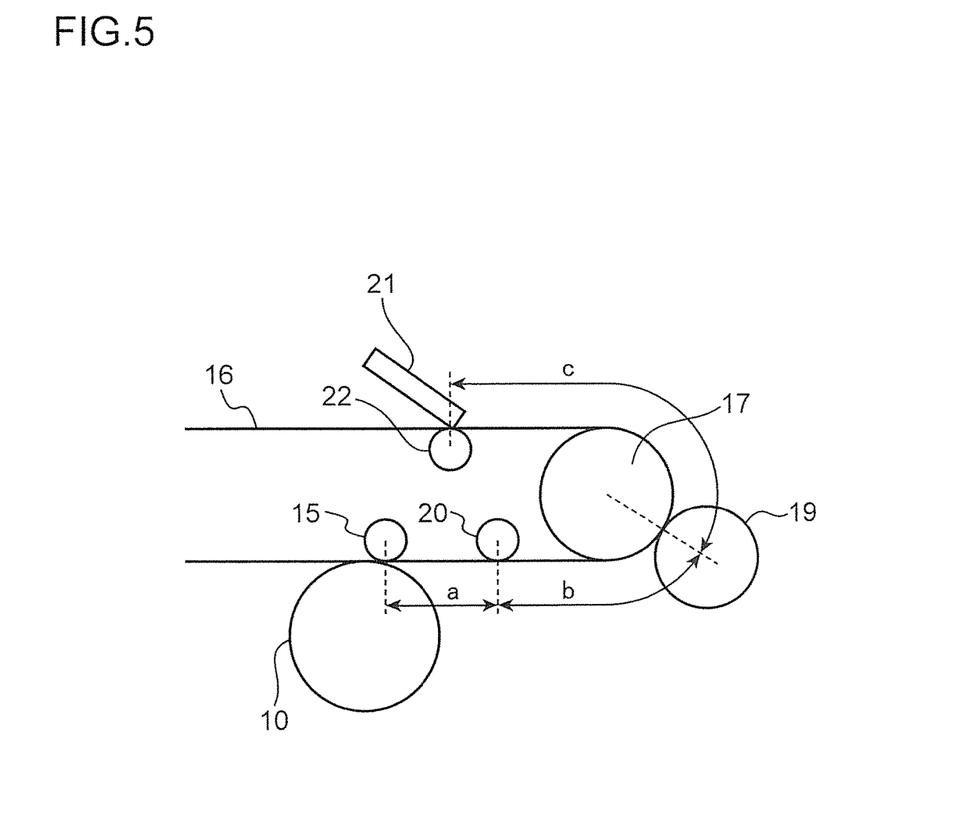
FIG. 5 is a schematic diagram illustrating a positional relationship between the most-downstream primary transfer roller, a contact member, the support roller, and a sub contact member in the image forming apparatus according to the third embodiment of the present disclosure.

Next, an image forming apparatus according to a third embodiment of the present disclosure is described. FIG. 4 is a schematic sectional view illustrating a structure on the periphery of a most-downstream primary transfer roller 15 and a drive roller 17 in the image forming apparatus according to the present embodiment. Further, FIG. 5 is a schematic diagram illustrating a positional relationship between the most-downstream primary transfer roller 15, a rectifier roller 20, the driver roller 17, and a blade opposing roller 22 (sub contact member) in the image forming apparatus according to the present embodiment. In FIG. 4 and FIG. 5, members having the same functions as those of the members in the first embodiment are indicated with the same reference numerals as those in FIG. 2. Further, since the third embodiment is different from the first embodiment in a point that the image forming apparatus in the third embodiment includes a second rectifier bias applying unit 72 and an opposing roller bias applying unit 80, description on the different point is described, and description on the same points is omitted.

Referring to FIG. 4, the image forming apparatus includes the second rectifier bias applying unit 72 (contact-member bias applying unit) and the opposing roller bias applying unit 80 (sub-contact-member bias applying unit).

The second rectifier bias applying unit 72 is electrically connected to the rectifier roller 20 in place of the first rectifier bias applying unit 70 in the first embodiment. The second rectifier bias applying unit 72 includes a direct-current power supply and an alternate-current power supply. The second rectifier bias applying unit 72 applies a bias voltage of the same polarity as the polarity of a second transfer bias voltage to the rectifier roller 20.

The opposing roller bias applying unit 80 includes a direct-current power supply and an alternate-current power supply. The opposing roller bias applying unit 80 applies a bias voltage of the same polarity as the polarity of a primary transfer bias voltage to the blade opposing roller 22.

In the present embodiment, when an image forming operation is performed, the second rectifier bias applying unit 72 applies a bias voltage of the same polarity as the polarity of a secondary transfer bias voltage to the rectifier roller 20. In this case, since the potential of the drive roller 17 and the potential of the rectifier roller 20 have the same polarities, leak current of secondary transfer current is less likely to flow from the drive roller 17 to the rectifier roller 20. Further, even when leak current of secondary transfer current flows from the drive roller 17, the leak current is likely to flow to the blade opposing roller 22 on the side opposite to the most-downstream primary transfer roller 15. Further, in the present embodiment, the potential of the most-downstream primary transfer roller 15 and the potential of the rectifier roller 20 have polarities opposite to each other. Therefore, although leak current of primary transfer current is likely to flow from the most-downstream primary transfer roller 15 to the rectifier roller 20, the leak current is less likely to flow to the drive roller 17. Thus, interference between a primary transfer bias voltage and a secondary transfer bias voltage is prevented, and occurrence of an image defect due to interference between these bias voltages is prevented.

Further, referring to FIG. 5, when it is assumed that a distance between the most-downstream primary transfer roller 15 and the rectifier roller 20 along an inner peripheral surface of an intermediate transfer belt 16 is a (mm), a distance between the rectifier roller 20 and the drive roller 17 along the inner peripheral surface of the intermediate transfer belt 16 is b (mm), and a distance between the drive roller 17 and the blade opposing roller 22 along the inner peripheral surface of the intermediate transfer belt 16 is c (mm), it is desirable that a relationship: a<b and c<b is satisfied. In this case, leak current is further less likely to flow from the drive roller 17 to the rectifier roller 20. Further, even when leak current flows from the drive roller 17, the leak current is further likely to flow to the blade opposing roller 22 on the side opposite to the most-downstream primary transfer roller 15. Further, even when leak current of primary transfer current flows from the most-downstream primary transfer roller 15 to the rectifier roller 20, the leak current is less likely to flow to the drive roller 17. As an example, it is desirable that the distances a, b, and c satisfy the following relationship: a=20 (mm), b=40 (mm), and 30 (mm)≤c<40 (mm). The distance a between the most-downstream primary transfer roller 15 and the rectifier roller 20 along the inner peripheral surface of the intermediate transfer belt 16 corresponds to a distance from an intersection point between a straight line passing through the center of rotation of the most-downstream primary transfer roller 15 and orthogonal to a belt surface of the intermediate transfer belt 16 and the belt surface, to an intersection point between a straight line passing through the center of rotation of the rectifier roller 20 and orthogonal to a belt surface of the intermediate transfer belt 16 and the belt surface. Likewise, the distance b between the rectifier roller 20 and the drive roller 17 along the inner peripheral surface of the intermediate transfer belt 16 corresponds to a distance from an intersection point between a straight line passing through the center of rotation of the rectifier roller 20 and orthogonal to the belt surface of the intermediate transfer belt 16 and the belt surface, to an intersection point between a straight line connecting the center of rotation of the drive roller 17 and the center of rotation of the secondary transfer roller 19 and the belt surface of the intermediate transfer belt 16. Further, the distance c between the drive roller 17 and the blade opposing roller 22 along the inner peripheral surface of the intermediate transfer belt 16 corresponds to a distance from an intersection point between a straight line passing through the center of rotation of the blade opposing roller 22 and orthogonal to the belt surface of the intermediate transfer belt 16 and the belt surface, to an intersection point between a straight line connecting the center of rotation of the drive roller 17 and the center of rotation of the secondary transfer roller 19 and the belt surface of the intermediate transfer belt 16.

In the foregoing, the embodiments of the present disclosure are described in detail. According to the aforementioned configuration, it is possible to prevent interference between a primary transfer bias voltage and a secondary transfer bias voltage, and to prevent occurrence of an image defect due to interference between these bias voltages. Therefore, it is possible to form a stable toner image on a sheet. As described above, in an image forming apparatus in which a color image is formed by toners of different colors, it is possible to prevent a change of color on an image by preventing an image defect due to bias voltage interference between a primary transfer bias voltage and a secondary transfer bias voltage.

The present disclosure, however, is not limited to the above. The present disclosure includes the following modifications, for example.

(1) In the foregoing embodiments, an image forming apparatus forms an image based on toners of four colors. The present disclosure, however, is not limited to the above. The image forming apparatus may form an image based on toners of two colors or based on toners of five or more colors.

(2) Further, in the second embodiment, the resistance unit 71 includes the resistor 71B and the Zener diode 71A (rectifying element). The present disclosure, however, is not limited to the above. The resistance unit 71 may include only one of the resistor 71B and the Zener diode 71A.

(3) Further, a contact member and a sub contact member in the present disclosure are not limited to a member having a roller shape. The contact member and the sub contact member may have another shape such as a plate shape, a sheet shape, or a box shape.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. An image forming apparatus, comprising:
a plurality of photosensitive drums, each of which is configured to form an electrostatic latent image on a surface thereof, and to carry a toner image;
an intermediate transfer belt disposed to face the plurality of photosensitive drums, and configured to circulatingly move in a predetermined circulating direction;
a plurality of primary transfer rollers, each of which is disposed to face a corresponding one of the plurality of photosensitive drums with respect to the intermediate transfer belt, and is configured to primarily transfer the toner image from the corresponding one of the plurality of photosensitive drums onto the intermediate transfer belt;
a support roller for supporting an inner peripheral surface of the intermediate transfer belt at a position downstream of the plurality of primary transfer rollers in the circulating direction;
a secondary transfer roller disposed to face the support roller with respect to the intermediate transfer belt, and configured to secondarily transfer the toner image from the intermediate transfer belt onto a sheet;
a conductive contact member disposed to come into contact with the inner peripheral surface of the intermediate transfer belt between the support roller and a most-downstream primary transfer roller located on a most-downstream side among the plurality of primary transfer rollers in the circulating direction;
a primary transfer bias applying unit for applying a primary transfer bias voltage of a polarity opposite to a polarity of the toner to the plurality of primary transfer rollers;
a secondary transfer bias applying unit for applying a secondary transfer bias voltage of a same polarity as the polarity of the toner to the support roller; and
a contact-member bias applying unit for applying a bias voltage of a same polarity as the polarity of the primary transfer bias voltage or the polarity of the secondary transfer bias voltage to the contact member, wherein
the contact-member bias applying unit applies, to the contact member, the bias voltage such that leak current is allowed to flow from one of the support roller and the most-downstream primary transfer roller to the contact member, and flow of leak current from the other of the support roller and the most-downstream primary transfer roller to the contact member is prevented.

2. The image forming apparatus according to claim 1, wherein
the contact member is a roller member including an outer peripheral surface that comes into contact with the inner peripheral surface of the intermediate transfer belt.

3. The image forming apparatus according to claim 2, wherein
the roller member is rotated in accordance with circulating movement of the intermediate transfer belt when a driving force is applied from the intermediate transfer belt by contact of the inner peripheral surface of the intermediate transfer belt with the outer peripheral surface of the roller member.

4. An image forming apparatus, comprising:
a plurality of photosensitive drums, each of which is configured to form an electrostatic latent image on a surface thereof, and to carry a toner image;
an intermediate transfer belt disposed to face the plurality of photosensitive drums, and configured to circulatingly move in a predetermined circulating direction;
a plurality of primary transfer rollers, each of which is disposed to face a corresponding one of the plurality of photosensitive drums with respect to the intermediate transfer belt, and is configured to primarily transfer the toner image from the corresponding one of the plurality of photosensitive drums onto the intermediate transfer belt;
a support roller for supporting an inner peripheral surface of the intermediate transfer belt at a position downstream of the plurality of primary transfer rollers in the circulating direction;
a secondary transfer roller disposed to face the support roller with respect to the intermediate transfer belt, and configured to secondarily transfer the toner image from the intermediate transfer belt onto a sheet;
a conductive contact member disposed to come into contact with the inner peripheral surface of the intermediate transfer belt between the support roller and a most-downstream primary transfer roller located on a most-downstream side among the plurality of primary transfer rollers in the circulating direction;
a primary transfer bias applying unit for applying a primary transfer bias voltage of a polarity opposite to a polarity of the toner to the plurality of primary transfer rollers;

a secondary transfer bias applying unit for applying a secondary transfer bias voltage of a same polarity as the polarity of the toner to the support roller;

a contact-member bias applying unit for applying a bias voltage of a same polarity as the polarity of the primary transfer bias voltage or the polarity of the secondary transfer bias voltage to the contact member; and a rectifying element, wherein the contact member is grounded via the rectifying element.

5. The image forming apparatus according to claim 4, further comprising:

a resistor connected to the rectifying element in parallel, and having a predetermined resistance value.

6. An image forming apparatus, comprising:

a plurality of photosensitive drums, each of which is configured to form an electrostatic latent image on a surface thereof, and to carry a toner image;

an intermediate transfer belt disposed to face the plurality of photosensitive drums, and configured to circulatingly move in a predetermined circulating direction;

a plurality of primary transfer rollers, each of which is disposed to face a corresponding one of the plurality of photosensitive drums with respect to the intermediate transfer belt, and is configured to primarily transfer the toner image from the corresponding one of the plurality of photosensitive drums onto the intermediate transfer belt;

a support roller for supporting an inner peripheral surface of the intermediate transfer belt at a position downstream of the plurality of primary transfer rollers in the circulating direction;

a secondary transfer roller disposed to face the support roller with respect to the intermediate transfer belt, and configured to secondarily transfer the toner image from the intermediate transfer belt onto a sheet;

a conductive contact member disposed to come into contact with the inner peripheral surface of the intermediate transfer belt between the support roller and a most-downstream primary transfer roller located on a most-downstream side among the plurality of primary transfer rollers in the circulating direction;

a primary transfer bias applying unit for applying a primary transfer bias voltage of a polarity opposite to a polarity of the toner to the plurality of primary transfer rollers;

a secondary transfer bias applying unit for applying a secondary transfer bias voltage of a same polarity as the polarity of the toner to the support roller;

a contact-member bias applying unit that applies a bias voltage of a same polarity as the polarity of the secondary transfer bias voltage to the contact member;

a conductive sub contact member disposed to come into contact with the inner peripheral surface of the intermediate transfer belt on a downstream side than the support roller in the circulating direction; and a sub-contact-member bias applying unit for applying a bias voltage of a same polarity as the polarity of the primary transfer bias voltage to the sub contact member.

7. The image forming apparatus according to claim 6, wherein when it is assumed that a distance between the most-downstream primary transfer roller and the contact member along the inner peripheral surface of the intermediate transfer belt is a (mm), a distance between the contact member and the support roller along the inner peripheral surface of the intermediate transfer belt is b (mm), and a distance between the support roller and the sub contact member along the inner peripheral surface of the intermediate transfer belt is c (mm), the image forming apparatus satisfies a relationship: $a<b$ and $c<b$.

* * * * *